United States Patent
McCallen et al.

(10) Patent No.: US 9,769,051 B2
(45) Date of Patent: Sep. 19, 2017

(54) DEMARCATION UNIT ENCLOSURE AND METHOD

(71) Applicant: JDS Uniphase Corporation, Milpitas, CA (US)

(72) Inventors: Michael McCallen, Nepean (CA); John Parry, Ottawa (CA); David George Coomber, Nepean (CA); James Goodchild, Kanata (CA); Brian Sungwan Kim, Ottawa (CA)

(73) Assignee: VIAVI SOLUTIONS INC., Milpitas, CA (US)

( * ) Notice: Subject to any disclaimer, the term of this patent is extended or adjusted under 35 U.S.C. 154(b) by 251 days.

(21) Appl. No.: 14/595,290

(22) Filed: Jan. 13, 2015

(65) Prior Publication Data

US 2015/0200837 A1 Jul. 16, 2015

Related U.S. Application Data

(60) Provisional application No. 61/926,542, filed on Jan. 13, 2014.

(51) Int. Cl.
*H04L 12/26* (2006.01)
*H04B 10/40* (2013.01)

(52) U.S. Cl.
CPC ............ *H04L 43/50* (2013.01); *H04B 10/40* (2013.01); *Y04S 40/168* (2013.01)

(58) Field of Classification Search
None
See application file for complete search history.

(56) References Cited

U.S. PATENT DOCUMENTS

| 7,336,673 | B2 | 2/2008 | Ilnicki et al. ................. 370/412 |
| 7,488,121 | B2 | 2/2009 | Dugan ............................. 385/92 |
| 7,610,408 | B2 | 10/2009 | Jones ............................ 709/250 |
| 7,634,611 | B2 | 12/2009 | Hidai et al. ................... 710/314 |
| 7,746,949 | B2 | 6/2010 | Curran-Gray et al. ........ 375/267 |
| 7,868,780 | B2 | 1/2011 | Engel et al. ............. 340/870.07 |
| 7,917,950 | B2 | 3/2011 | Ilnicki ............................. 726/22 |
| 8,427,966 | B2 | 4/2013 | Ilnicki .......................... 370/252 |
| 2012/0326865 | A1* | 12/2012 | Cao ....................... G06F 11/221 340/540 |
| 2013/0039654 | A1* | 2/2013 | Park ....................... H04B 10/40 398/41 |
| 2013/0077499 | A1* | 3/2013 | Schmitz ............... H04J 3/0688 370/249 |
| 2013/0330079 | A1 | 12/2013 | Kauffeldt et al. .............. 398/79 |
| 2014/0075049 | A1 | 3/2014 | Liu ............................... 709/244 |

(Continued)

OTHER PUBLICATIONS

JDS Uniphase Corporation, "The PacketPortal-Enabled SFProbe and How it Differs from a Standard SFP Transceiver", http://www.jdsu.com , Feb. 2012.

*Primary Examiner* — Vinncelas Louis
(74) *Attorney, Agent, or Firm* — Mannava & Kang, P.C.

(57) ABSTRACT

A target network transceiver is tested or monitored using an intelligent transceiver programmed to perform such testing and to transmit test results to a remote server. A demarcation unit enclosure is provided that includes two ports for the target and intelligent transceivers that are connected by a direct data link. An interface circuit connecting control interfaces of the two transceiver ports polls the target transceiver and passes polled control information to the intelligent transceiver.

16 Claims, 7 Drawing Sheets

(56) References Cited

U.S. PATENT DOCUMENTS

2014/0169785 A1* 6/2014 Roullot ................ H04B 10/40
                                                      398/25
2014/0301221 A1* 10/2014 Nadeau ................ H04L 43/12
                                                      370/252

* cited by examiner

DEMARCATION UNIT ENCLOSURE AND METHOD

CROSS-REFERENCE TO RELATED APPLICATIONS

The present application claims priority from U.S. Provisional Patent Application No. 61/926,542 filed Jan. 13, 2014, entitled "Optical demarcation simplification for remote management based on extension of Intelligent transceiver function", which is incorporated herein by reference.

TECHNICAL FIELD

The embodiments disclosed herein relate generally to communication networks, and more particularly relate to devices and methods for testing and monitoring of network transceivers.

BACKGROUND

Communication networks may employ devices and systems for testing and monitoring of network performance, including testing and monitoring of various installed network equipment. Locations where such testing and monitoring may be conveniently performed include demarcation units, which are typically installed at network demarcation points where a customer network or equipment physically connects to a provider's network. A typical demarcation unit may include two transceiver ports, one facing the customer and one facing the provider's network, and an internal processor programmed to perform various network element functions, including in-service active and passive transceiver testing and monitoring and layer-2 processing of network traffic passing through the demarcation unit. A typical demarcation unit may also require a host interface through which the unit can be programmed and the test and measurement results made accessible to the user.

Accordingly, a conventional demarcation unit is a relatively complex device that may require a fast processor capable of operating at a line data rate to reduce latency, and which may also require an on-site visit to be re-programmed. It may therefore be desirable to provide a simplified and/or remotely reconfigurable transceiver testing device that may be used in network demarcation units and wherever remote transceiver testing or monitoring may be required.

SUMMARY

Accordingly, the present disclosure in one aspect thereof relates to a method and apparatus for implementing a network device with testing and/or monitoring capabilities, such as a demarcation unit, which employs an intelligent transceiver to test and monitor a co-located transceiver, with the intelligent transceiver being capable of creating and transmitting management packets carrying test results data.

One aspect of the disclosure relates to a network demarcation unit (NDU) enclosure, which comprises the following elements: a housing; a first transceiver port in the housing for receiving a first transceiver (TR); a second TR port in the housing for receiving a second TR, the second TR comprising logic configured for monitoring or testing the first TR, wherein each of the first and second TR ports comprises a control and management interface and a data interface; a direct electrical data connection directly connecting the data interfaces of the first and second TR ports for transparently transmitting pass-through data between the first and second TRs at any line rate supported by the first and second TR; and a TR interface circuit connecting the control and management interfaces of the first and second TRs. The TR interface circuit is configured for obtaining control information from the first TR, and for communicating the control information to the second TR, when the first and second TRs are operatively connected to the NDU enclosure at the first and second TR ports, respectively. A power distribution unit may be further provided for distributing electrical power to the 1st and 2nd TR ports and to the TR interface circuit. A further aspect of the present disclosure relates to a method for implementing an NDU in a communication network that comprises installing the second TR having logic configured for testing and/or monitoring the first TR into the second TR port of the NDU enclosure described hereinabove. The TR interface circuit of the NDU enclosure may be further configured for receiving, from the second TR, one or more commands requesting the control information related to the first TR, and for obtaining the control information from the first TR in accordance with the one or more commands.

One aspect of the present invention relates to a method for operating a network demarcation unit (NDU) in a communication network. The method comprises installing a target TR into a first TR port of an NDU enclosure comprising at least the first TR port and a second TR port, wherein the first TR port and the second TR port each comprise a data interface and a control and management interface. The NDU enclosure further comprises a direct data link between the data interfaces of the first TR port and the second TR port, and a TR interface circuit connecting the control and management interfaces of the first TR port and the second TR port. The method further comprises installing an intelligent TR into the second TR port of the NDU enclosure, wherein the intelligent TR comprises logic for testing or monitoring of the target TR and for communicating the control information obtained from the target TR to a remote server, and connecting the target TR and the intelligent TR to the network so as to enable data pass-through. The method further comprises using the TR interface circuit for polling the target TR installed into the first TR port for control information, and for communicating the control information to the TR intelligent TR installed into the second TR port.

One aspect of the present invention relates to a method for testing a target transceiver (TR) in a network. The method comprises installing the target TR into a first TR port of an NDU enclosure comprising at least the first TR port and a second TR port, wherein the first TR port and the second TR port each comprise a data interface and a control and management interface. The NDU enclosure further comprises a direct data link between the data interfaces of the first TR port and the second TR port, and a TR interface circuit connecting the control and management interfaces of the first TR port and the second TR port. The method further comprises installing an intelligent TR into the second TR port of the NDU enclosure, wherein the intelligent TR comprises logic for testing or monitoring of the target TR and for communicating the control information obtained from the target TR to a remote server, and connecting the target TR and the intelligent TR to the network so as to enable data pass-through. The method further comprises using the TR interface circuit for polling the target TR installed into the first TR port for control information, and for communicating the control information to the TR intelligent TR installed into the second TR port.

BRIEF DESCRIPTION OF THE DRAWINGS

Embodiments disclosed herein will be described in greater detail with reference to the accompanying drawings, in which like elements are indicated with like reference numerals, and wherein.

DETAILED DESCRIPTION

In the following description, for purposes of explanation and not limitation, specific details are set forth, such as particular optical and electrical circuits, circuit components, assemblies, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description. Note that as used herein, the terms "first", "second" and so forth are not intended to imply sequential ordering, but rather are intended to distinguish one element from another unless explicitly stated otherwise.

Figure 1:
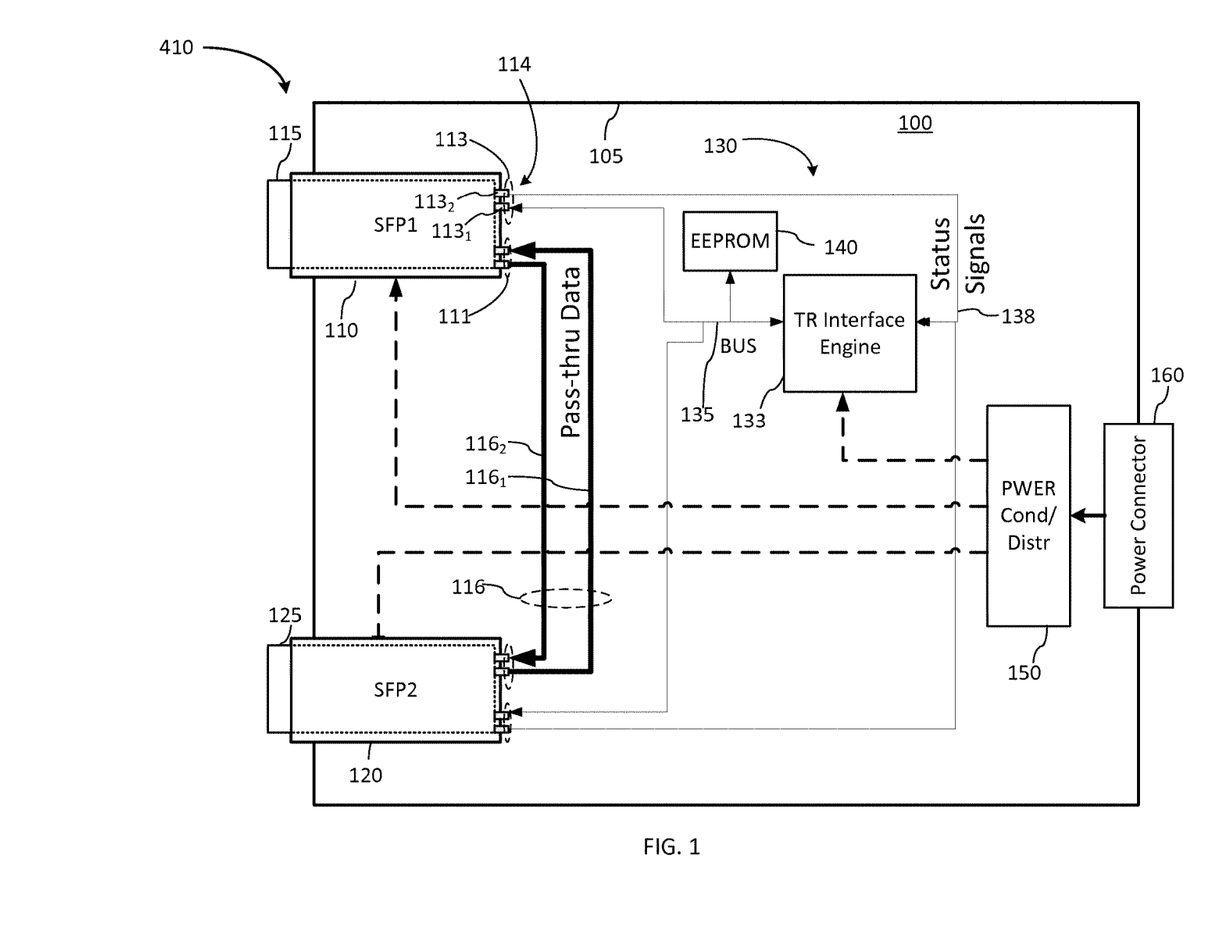
FIG. 1 is a schematic block diagram of an exemplary embodiment of a network demarcation unit (NDU) enclosure.

Referring first to FIG. 1, in accordance with one embodiment a network demarcation unit (NDU) enclosure 100 includes a housing 105, a first transceiver (TR) port 110 in the housing for receiving a first transceiver (TR) 115, a second TR port 120 in the housing for receiving a second TR 125, and a power entry connector 160 for connecting to a source of electrical power, such as a power outlet or a USB bus carrying electrical power. Each of the first and second TR ports 110 and 120 may function as a TR receptacle that is configured for receiving a TR, and includes an electrical interface 114 for connecting to an electrical, or host, interface of a TR. The electrical interface 114 of each of the TR ports 110, 120 includes in turn a control and management interface 113 and a data interface 111, for connecting to respective control and management interface and customer data interface of the electrical (host) interface of the TR when the latter is installed into the TR port, as known in the art for network equipment designed to accept network transceivers. In a typical embodiment the control and management interface 113 may include a communication bus connector $113_1$ for connecting to a communication bus interface of the TR, and one or more 'status' and/or 'control' connectors $113_2$ for connecting to 'status' and/or 'control' connectors or pins of the TR. The NDU enclosure 100 with the first and second TRs 115, 125 installed into the TR ports 110, 120 will be referred to herein as an NDU 410 or a device 410.

In some embodiments the first and second TR ports 110, 120 may be configured to receive SFP (Small Formfactor Pluggable) TRs, such as those described in an SFP MSA (Multiple Source Agreement). In one embodiment the first and second TR ports 110, 120 are configured to receive SFP TRs as defined in "INF-8074i Specification for SFP Transceiver", which describes specifications of SFP Transceivers developed by the SFF (Small Form-Factor) MSA group. In other embodiments TR ports 110, 120 may be configured for receiving other types of TRs, including but not limited to other varieties of SFP transceivers such as SFP+, XFP, etc.

A direct electrical data connection or link 116 between the TR ports 110, 120 is further provided for directly connecting the data interfaces 111 of the first and second TR ports 110, 120. In an embodiment configured to receive typical SFP TRs, the electrical data connection 116 may be a two-line data link that provides a direct, latency-free and line-rate-transparent path for data traffic and other data that in operation would be passing through the device 410. Each of the data interfaces 111 of the first and second TR ports 110, 120 may include an input data line connection point and an output data line connection point, and the direct electrical data connection 116 may be in the form of two conducting RF lines $116_1$ and $116_2$ electrically connecting the input and output data line connection points of the first TR port 110 to the output and input, respectively, data line connection points of the second TR port 120, preferably without data taping, data regeneration, or any type of data processing. Preferably, the direct electrical data link 116 provides a transmission line type data connection or direct wiring between the first and second TR ports 110, 120 that is substantially line-rate transparent, i.e. in operation transmits the pass-through data between the first and second TRs 115, 125 at any line rate supported by the first and second TRs, substantially without delay other than that associated with the finite velocity of the propagation of the electrical data signal along a conducting RF guide. By way of example, the electrical data link 116 may be in the form of two independent differential pair transmission line paths formed in a PCB (printed circuit board), or other suitable PCB level wiring.

In accordance with one aspect of the disclosure, the NDU enclosure 100 may be transformed into a fully functional NDU 410 by installing a suitably configured 'intelligent', or 'smart', TR into one of the first and second TR ports 110, 120, wherein the 'intelligent' or 'smart' TR includes hardware logic, e.g. in the form of a processor and a memory, that is configured for monitoring or testing a 'target' TR that may be installed into the other of the TR ports 110, 120. For clarity of the description, in the following we assume that the first TR 115, which in operation is received in the first TR port 110, is the target TR, and the second TR 125, which in operation is received in the second TR port 120, is the 'intelligent' TR, which is also referred to as the 'smart' TR. It will be appreciated that 'smart' or 'intelligent' TRs that are capable of being configured for performing functions described herein are known in the art and are commercially available. Intelligent or smart TRs that may be programmed to perform specific functionalities, including packet filtering and injection, are known in the art and are described, for example, in U.S. Pat. No. 7,746,949 entitled "Communications apparatus, system and method of creating a subchannel" issued Jun. 29, 2010 to Martin Curran-Gray et al.; U.S. Pat. No. 7,868,780 entitled "System and method for test probe management" issued Jan. 11, 2011 to Glen R. Engel et al.; U.S. Pat. No. 8,427,966 entitled "Programmable passive probe" issued Apr. 23, 2013 to Slawomir K. Ilnicki;

U.S. Pat. No. 7,488,121 entitled "Optical transceiver module" issued Feb. 10, 2009 to Richard W. Dugan; U.S. Pat. No. 7,634,611 "Multi-master, chained two-wire serial bus" issued Dec. 15, 2009 to Takashi Hidai et al.; U.S. Pat. No. 7,610,408 "Automatic link commissioning" issued Oct. 27, 2009 to Jeffrey P Jones; U.S. Pat. No. 7,917,950 entitled "Protocol-generic eavesdropping network device" issued 29 Mar. 2011 to Slawomir K. Ilnicki; and U.S. Pat. No. 7,336,673 entitled "Creating a low bandwidth channel within a high bandwidth packet stream" issued Feb. 26, 2008 to Slawomir K. Ilnicki et al., all of which are incorporated herein by reference.

The intelligent TR 125 may include logic that is configured for recognizing control packets received from the network, processing those packets, extracting therefrom instructions related to testing and monitoring of the target TR 115, and saving those instructions in pre-defined registers of on-board memory of the TR, which may also include registers for storing test data. The internal logic of the TR 125 may also be capable of processing test results related to the target TR and communicating the test results to a remote server. By way of example, the intelligent TR 125 may be, for example, in the form of a suitably programmed SFProbe™ of JDSU PacketPortal™, which are described in "White Paper: The PacketPortal-Enabled SFProbe and How it Differs from a Standard SFP Transceiver", which is available from a JDSU website http://www.jdsu.com, and which is incorporated herein by reference. Further by way of example, the intelligent TR 125 may be embodied as a suitably programmed micro Ethernet probe JMEP™ that is available from JDSU.

Continuing to refer to FIG. 1, the NDU enclosure 100 further includes a TR interface circuit 130, which connects the control and management interfaces 113 of the first and second TR ports 110, 120 and in operation facilitates exchange of control and management information between the first TR 115 and the second TR 125, when the first and second TRs 115, 125 are operatively connected to the NDU enclosure 100 at the TR ports 110 and 120, respectively, such as by installing, e.g. by plugging or otherwise, into said ports. More particularly, in one embodiment the TR interface circuit 130 may be configured for obtaining, from the second TR 125, one or more commands requesting control information related to the first TR 115, for polling the first TR 115 for the control information in accordance with the commands, and for transmitting the requested control information from the first TR 115 to the second TR 125. In another embodiment, the TR interface circuit 130 may be simply monitoring status signals of the first TR and communicating changes in the status signals of the first TR to the second TR.

In one embodiment, the TR interface circuit 130 includes an interface engine (IE) 133 that is operatively connected to the control and management interfaces 113 of the first and second TR ports 110, 120. In one embodiment, this connection is at least in part implemented using a control bus 135. In one embodiment, the control bus 135 connects to the bus connectors $113_1$ of the TR control and management interface 113 of the TR ports 110, 120, and through the port bus connectors $113_1$—to the communication bus interface of a TR that is installed into the port. One or more 'control & status' lines 138 may further be provided for connecting the IE 133 to the 'control' and/or 'status' connectors $113_2$ of the control and management interface 113 of at least one of the TR ports 110, 120. When a TR is installed into one of the TR ports 110, 120, the bus connectors $113_1$ and the status line connectors $113_2$ of the TR port connect the serial bus 135 and the status line 138 to the corresponding portions of the electrical interface of the TR.

By way of example, the control & status portion of the host interface of a typical SFP TR may include the following 'status' pins, as define in the INF-8074i Specification for SFP Transceiver, which is incorporated herein by reference: a 'Transmitter (Tx) Fault' pin and a LOS (Loss of Signal) pin, and may further include the following 'control' pins: a 'Tx disable' pin for disabling the optical emitter in the TR, and a 'rate select' pin for selecting between full or reduced receiver bandwidth, which are also defined in the INF-8074i Specification. Accordingly, the TR control & status connectors $113_2$ may then include connectors for each of these pins, with the electrical connections 130 coupling at least the 'status pins' connectors to the IE 133.

An optional non-volatile memory device 140, for example in the form of an EEPROM, may be further provided within the NDU enclosure 100, and may be coupled to the IE 133 via the bus 135, or in any other suitable way used in the art. The memory 140 may, for example, store NDU enclosure identification information.

The interface engine 133 may be configured for operating as a master device employing a suitable communication protocol to communicate with the memory 140 and the TRs 115, 125, which may operate as slave devices, over bus 135. By way of example, the control bus 135 may be a serial bus such as an I2C bus, and the interface engine 133 may operate as an I2C master in its communications with the TRs 115, 125 and the memory 140. The I2C (Inter-Integrated Circuit) is a known in the art clocked bi-directional serial transmission protocol that is controlled by a master with multiple slave devices sharing the same bus, wherein the data being exchanged over the bus is synchronized to a I2C clock signal from the IE 133. The I2C protocol defines a message structure that includes a target address, so that only one slave responds to a broadcast message, and data fields coded for 'reads' or 'writes'. An advantage of using the I2C bus in the NDU enclosure 100 is that the I2C bus is supported by most commercial SFP transceivers. It will be appreciated that other suitable serial or parallel communication buses can be used to implement the control bus 135, provided that the same bus is supported by the first and second TRs 115, 125.

Continuing to refer to FIG. 1, the NDU enclosure 100 may further include a power conditioning and distribution circuit or unit (PCDC) 150 that is coupled to the power entry connector 160. The PCDC 150 is configured for distributing electrical power of suitable voltage to the first and second TR ports 110 and 120 for powering the first and second TRs, and to the TR interface circuit 130, as would be known to those skilled in the art. The power entry connector 160 may be embodied, for example, using a USB connector that is capable of delivering electrical power as generally known in the art, or using any other suitable power connector. In one embodiment, the USB connector implementing the power entry connector 160 may be connected to the interface engine 133 with an optional signaling USB line for communications with an external computer or a host device, for example at the time of network installation.

Figure 2:
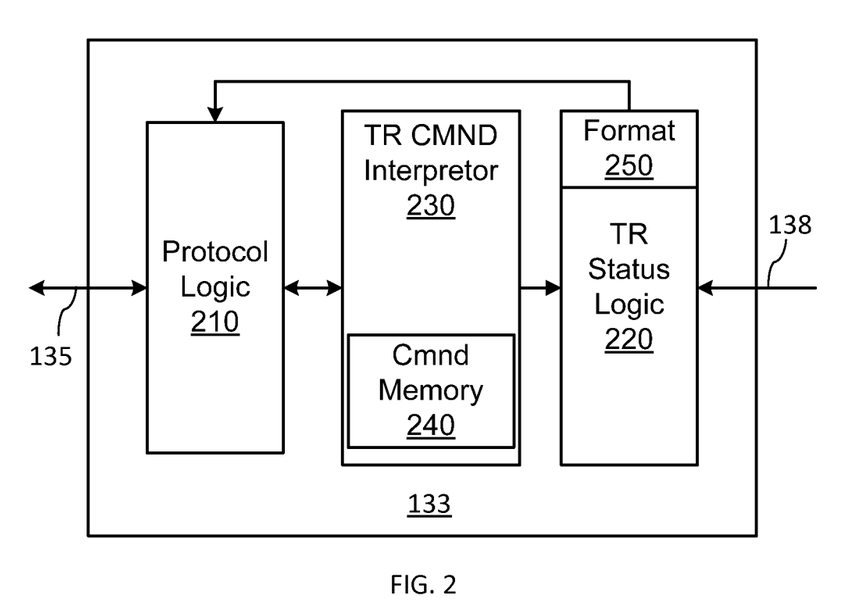
FIG. 2 is a schematic functional block diagram of an exemplary transceiver interface engine of the NDU enclosure of FIG. 1.

Turning now to FIG. 2, in one exemplary embodiment the IE 133 includes a protocol logic 210 and a TR status monitoring logic 220. In one embodiment, the IE 133 may further include a TR command interpreter logic 230. A function of the protocol logic 210 is to facilitate communications with the TR 115 and TR 125 over the control bus 135, while functions of the TR command interpreter logic 230 and the TR status monitoring logic 22 may include interpreting test and monitoring instructions or commands that are obtained from the second TR 125, and retrieving control information related to the first TR 115 in accordance with the instructions from the second TR 125, and communicating the retrieved information to the second TR 125. The protocol logic unit 210 may have multiple physical control buses to implement a virtual control bus 135 as known in the art.

Generally, the IE 133 may be embodied using any suitable processor, including but not limited to a suitable microcontroller, an FPGA, or an ASIC. Since the IE 133 is not in the path of the data traffic and therefore does not need to operate at the TR line rate, it may be implemented using a slower, less expensive processor than that is typically required in a conventional NDU. By way of example, a PIC or a mega-AVR microcontroller may be used for the IE 133. It will be appreciated that functional blocks 210, 220 and 230 may be implemented in software, in which case each of these blocks represents a set of instructions that are written in a processor-readable memory and are executable by the processor, or may be in the form of a suitable hardware- or firmware-defined logical circuit, such as that can be programmed into an FPGA as known in the art. Contrary to a conventional demarcation unit, the NDU enclosure 100 outsources all packet-level operations that may be required in an NDU to the intelligent TR 125, which enables the use of a slower on-board processor.

Figure 3:
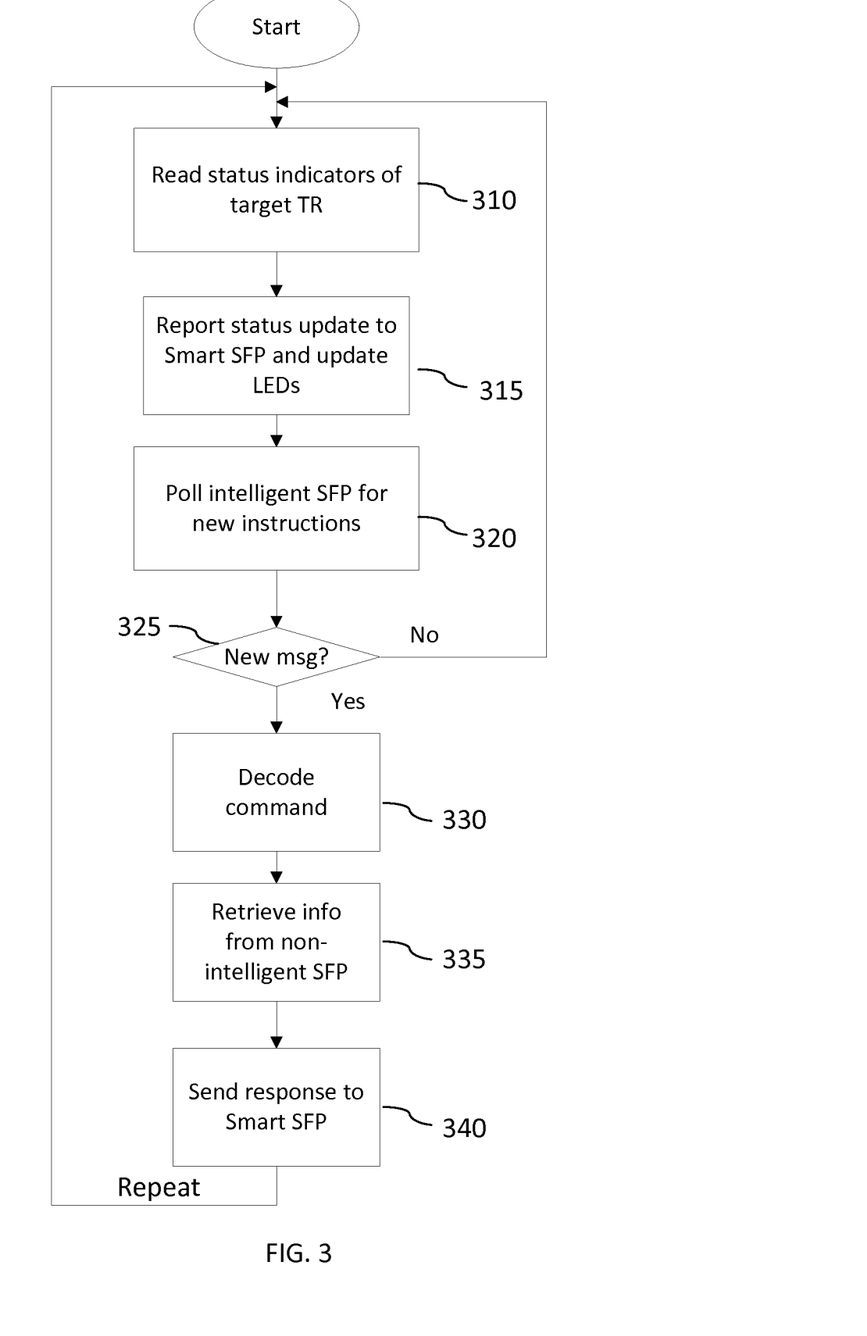
FIG. 3 is a flowchart illustrating an exemplary operation of the transceiver interface engine.

The operation of the NDU enclosure 100, with the first and second TRs 115, 125 installed in and connected to a network, will now be described by way of examples with reference to the flowchart shown in FIG. 3 and to the block diagrams of FIGS. 1 and 2. In various embodiment, the IE 133 may be configured to perform one or more operations indicated at blocks 310 to 340 in FIG. 3; in some embodiments, the IE 133 may perform only a subs-set of these operations, as described hereinbelow by way of example. In some embodiments, the IE 133 may also perform other operations, such as for example polling the first and/or second TRs 115, 125 for identification information at plug-in or start-up, either for reporting the TR identification information to a remote server or in order to identify which of the two installed-in TRs is the smart TR that is configured to drive the testing and/or report the test results to a remote server.

In one exemplary embodiment, the IE 133 may be configured, e.g. programmed, to read TR status signals of the first TR 115, as indicated at block 310, using the TR status logic 220, and then report a status signal update to the second TR 125 over the bus 135 using the protocol logic 210, as indicated at 315. In one embodiment, the operations at blocks 310, 315 may be continuously repeated at scheduled time intervals; in some embodiments, they may be initiated by a command from the second TR 125. In one embodiment, the update at block 315 is performed if a change in one or more status signals is detected, in which case the TR status logic 220 may send a status update message to the second TR 125. The operations indicated at 310 and 315 may include the TR status logic 220 reading electrical, e.g. voltage, levels at status pin connectors of the first TR port 110, and the protocol logic 210 communicating the corresponding status signal update to the second TR 125 via the communication bus 135, e.g. in the form of a binary word, where it may be written into a pre-determined 'test data' memory register of the second TR 125 reserved for a corresponding TR status indicator. The TR 125 may then send a status update message to a remote server over the network.

By way of example, the first TR 115 may be an SFP transceiver having a 'LOS' pin and a 'Tx fault' pin, e.g. as defined in the SFP MSA, and the TR status logic 220 of the IE 133 may be configured to read voltages on these 'status' pins. A change in one of these voltages my indicate that a LOS (loss of signal) condition or a transmitter (Tx) fault condition has been detected at the first TR 115. For example, if a 'high voltage' state is detected by the TR status logic 220 at the LOS pin contact of the first TR port 110, indicating a LOS at the receiver of the first TR 115, information about the LOS is passed to the protocol logic 210, which transmits a binary word indicating the detection of LOS to the smart TR 125, where it is written in a corresponding 'status' memory register. The smart TR 125 may then transmit a 'LOS detected' message to a remote server.

The IE 133 may be further configured to periodically poll the second TR 125 for instructions related to obtaining control information from the first TR 115, as indicated at 320. The instructions may for example be in the form of a binary word, or a sequence of bits, which is referred to herein as a command and which can be understood or decoded by the IE 133. This step or action may include the IE 133 polling one or more command registers of the TR 125, for example by sending a 'command request' message to the smart TR 125 over the bus 135. If new instructions, e.g. in the form of a test-related command, are found at 325, the new command may be passed to the TR command interpreter logic 230 for decoding at 330.

In one embodiment, the TR command interpreter logic 230 includes command look-up memory 240, which stores test actions or scripts for a plurality of commands that may be received from the smart TR 125, for example as a look-up table (LUT). Once a new command is received from the smart TR 125, the TR command interpreter logic 230 decodes the command and identifies which control information related to the first TR 115 is requested by the commands. This control information may include, for example, one or more status signals that the first TR 115 may generate. It may also include other information, for example the TR identification information, or any other information that may be stored in the on-board memory of the first TR. The command may also include instructions to perform a specified test or tests, e.g. monitor specific TR parameters, repeatedly during a prescribed time interval. In some embodiments, the command may include instructions to change the operation of the first TR 115, for example to change its line rate, to turn the optical emitter of the first TR 115 on or off, change its wavelength, or any other control command that is allowed by the control and management interface of the first TR 115.

Once the new command is decoded, at 335 the TR status logic 220 and/or the protocol logic 210 acts to retrieve the requested control information related to the first TR 115 through the control and management interface 113 of the first TR port 110. This step may include reading one or more status signals of the TR 115 over the status lines 138. It may also include polling the first TR 115 for TR identification information over the bus 135, or for any other information that may be stored in the internal memory of the first TR 115. For example if the first TR 115 is also a smart TR, the requested control information may include information pertaining to commands and/or settings that may be stored in its internal memory, and any other information that may be available from a smart TR.

At block 340, the control information retrieved from the first TR 115 is suitably formatted by the protocol logic 210 and sent to the second TR 125 in one or more binary messages, where it may be stored in pre-defined memory registers and/or processed by the internal processor logic of the smart TR for sending to a remote server.

Figure 4:
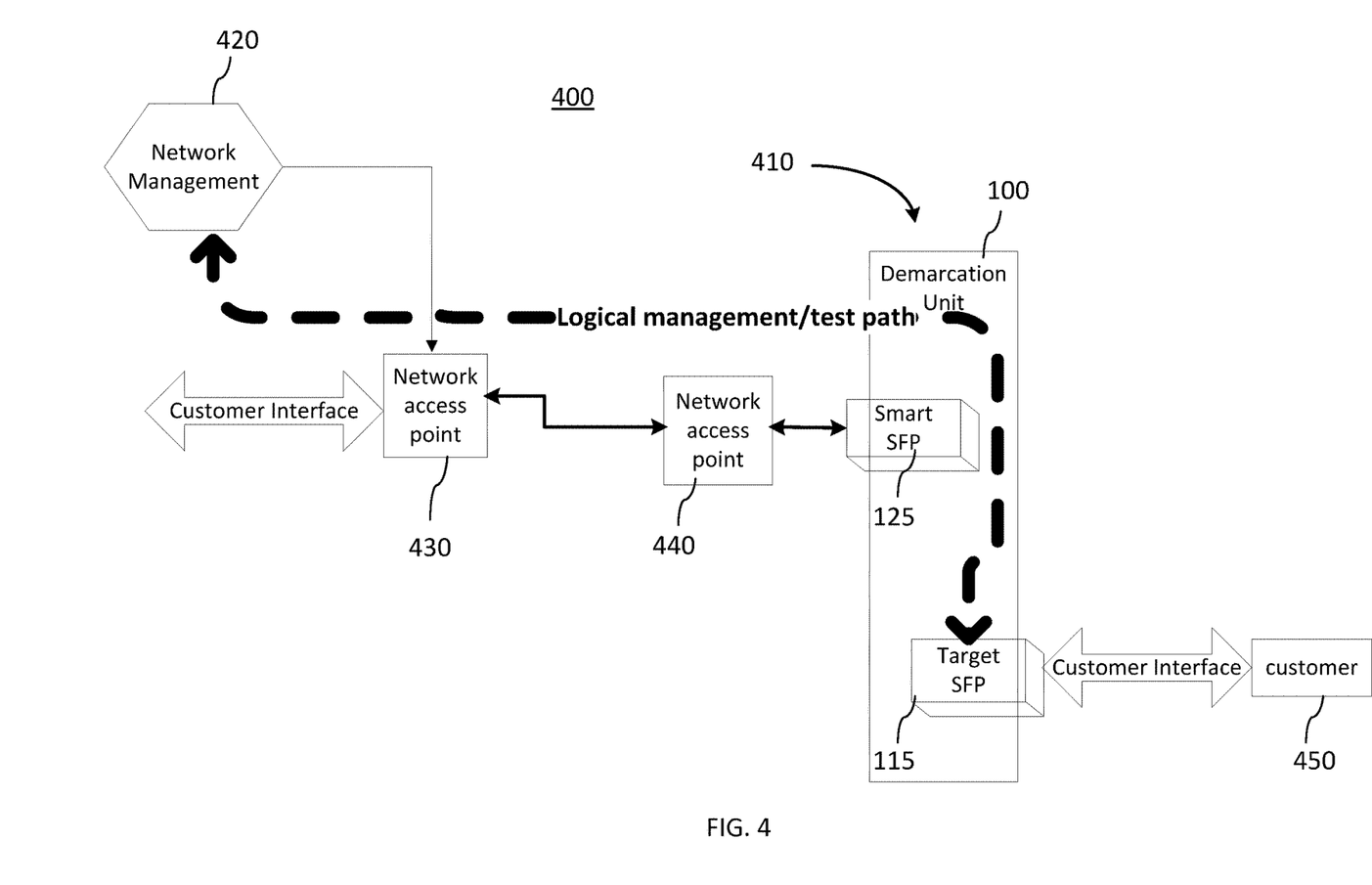
FIG. 4 is a schematic diagram illustrating one possible placement of the NDU within a communication network.

Turning now to FIG. 4, there is illustrated an exemplary deployment of the NDU enclosure 100 in a communication network 400. In this example, the NDU enclosure 100 is used to implement an NDU 410 that is deployed at an interface between a provider network and a customer network, with the provider network shown at the right of a network access point 440, and the customer network shown to the right of NDU 410. In operation, the NDU 410 enables remote management, testing and monitoring of the target transceiver 115 by a remote network management (NM) server (NMS) 420 that is connected to a remote network access point 430, and, generally, testing, management and monitoring services provided to the customer 450. The network access points 430 and 440 may be connected by one or more optical or electrical communication links. Similarly, the smart TR 125 may be connected to the network access point 440 by an optical or electrical link.

The NDU 410 is formed by installing a smart TR 125 and a target TR 115 into the first and second TR ports of the NDU enclosure 100. As described hereinabove, in one embodiment the smart TR 125 includes hardware and/or software logic configured to drive testing and/or monitoring the target TR 115, as typically required in an NDU, and to insert packets carrying test data into network traffic.

Figure 5:
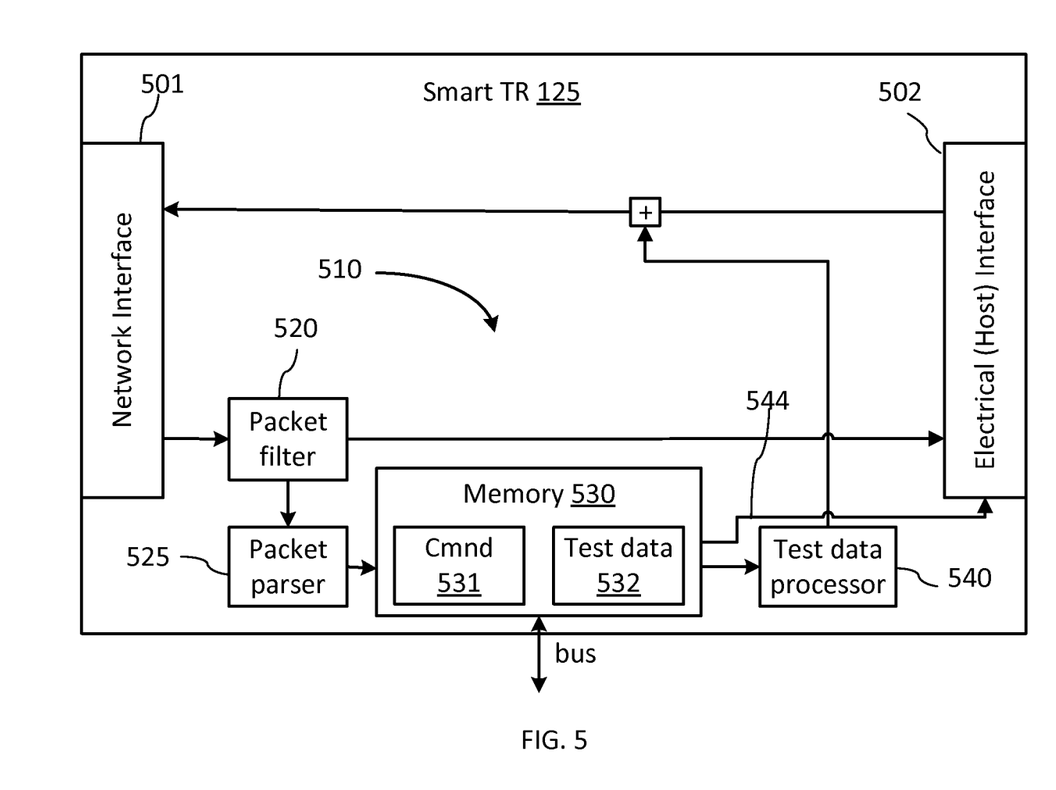
FIG. 5 is a schematic functional block diagram of an exemplary intelligent transceiver configured for use in the NDU enclosure of FIG. 1.

With reference to FIG. 5, there is illustrated an exemplary functional block diagram of one embodiment of the intelligent TR 125, which is also referred to herein as the 'smart' TR 125. Commonly with a typical conventional TR, the smart TR 125 includes a network interface 501 for connecting to a network, which could be either electrical or optical, and an electrical or host interface 502 that can be connected to the electrical interface 114 of one of the TR ports 110, 120 of the NDU enclosure 100. In the present specification the term 'electrical interface', when used with reference to a TR, is understood to refer to the host interface 502 of the TR unless specifically stated otherwise. The smart TR 125 additionally includes testing and monitoring logic 510 configured to drive testing and monitoring of the target TR 115 in the NDU 410 and to send resulting control information to the remote NMS 420. This logic may be configured, for example, for performing all testing and monitoring functions that are typically performed by a conventional network demarcation unit, such as for example an Ethernet demarcation unit, using processing capabilities of a host processor, including network layer 2 OAM (Operations, Administration, and Management) functions, layer 3, 4 and 7 testing and performance monitoring functions. Examples of such functions that the TR 125 may be configured to perform include, but not limited to, Deep packet inspection, Traffic Policing, Traffic Shaping, Service Mapping, i.e. VLAN tag add/removal, and Firewall. Note that the term 'logic', as used herein, refers to a logical circuit that may be configured in hardware, such as but not exclusively an FPGA or an ASIC, or using a combination of hardware and software as known in the art, for example in the form of a digital processor coupled to or including non-volatile memory storing software code defining the logic and executable by the processor.

As illustrated in FIG. 5, logic 510 includes a packet filter 520 that may be disposed in the network-host datapath and is configured to identify control and management packets that are addressed to the TR 125 and carry commands related to monitoring and testing of the target TR, to extract those packets from the pass-through traffic and to pass them to a packet parser 525. The packet parser 525 is configured to parse the management packets, to extract test-related commands from their payload, and to save the received command or commands in 'command' registers 513 of the on-board memory 530 of the TR, where it is accessible via a bus interface 544 by the interface engine 133 as described hereinabove. The on-board memory 530 of the 'smart' TR 125 may have 'command' registers 531 reserved for commands related to the TR testing instructions, and 'results' or 'test data' registers 532 reserved for storing test data that may be received from the host. In one embodiment, these registers 531, 532 are accessible over a serial bus interface 544, which is typically provided in a TR and which connects to the bus connector $113_1$ of the TR port of the NDU enclosure 100 when the TR is installed. A test data processing logic 540 functions to read the test data stored in the test data registers 532 and to process the test data as required for sending to a remote server. The suitably formatted test data may then be added to the outgoing data traffic in the form of management packets. The TR 125 may further include additional logic for performing measurements and packet-level processing of the network traffic that may be typically required in a demarcation unit. By way of example, TR 125 base demarcation functionality may include performance monitoring and activation testing at any layer, e.g. as specified in ITU Recommendations Y.1731 and Y.1564, and RFC-5357 and RFC-6349 documents of the Internet Engineering Task Force (IETF®), as well as deep packet inspection, policing, shaping, service mapping, firewall, etc. Generally, the internal logic of TR 125 may be configured to perform any function of a host processor of a conventional NDU.

Turning back to FIG. 4, in the illustrated embodiment the smart TR 125 connects to a provider network, while the target TR 115 connects to the customer network. In other embodiments, the smart TR 125 may connect on the customer side of the NDU. In those embodiments, the packet filter 520 may be disposed in the host-network datapath to filter out, or 'catch', management packets that are received from the network by the target TR 115 and passed to the smart TR 125 over the data transmission line $116_1$ in the NDU enclosure 100.

In one monitoring scenario, the smart TR 125 may simply transmit the control information related to the target TR 115 to the remote NMS 420 in the form of management data packets addressed to the NMS. In a more complex scenario, the NMS 420 may remotely program the smart TR 125 to perform specific testing and monitoring functions on the target TR 115. This may be accomplished, for example, by the NMS 420 sending to the smart TR 125 one or more management packets containing one or more commands identifying the specific testing or monitoring functions pertaining to the target TR 115. As described hereinabove with reference to FIG. 5, the smart TR 125 includes packet filters that are configured to identify control and management packets addressed to the TR and extract them from the pass-through traffic, parse their payload and save the received command or commands in command registers of the on-board memory of the TR, where it is accessible by the interface engine 133 as described hereinabove. The interface engine 133 than fetches the requested control information from the target TR 115, optionally formats it as required and passes it to the smart TR 125 for saving in the test data registers, and for eventually transmitting to the remote NMS 420. The TR 125 may also be remotely programmed from the NMS 420 by means of software image downloading as known in the art. In one embodiment, the NMS 420 may use the smart TR 125 to remotely program the IE 133. In one embodiment wherein both the TR 115 and 125 are smart SFP that include remotely programmable logic, one of the TRs 115, 125 may program the other. For example, in such embodiments the first TR 115 may trigger the second TR 125 to perform a specific action in response to the first TR 115 detecting an event.

Note that, although FIG. 4 shows the NDU 410 located at an interface between a provider network and a customer, in other embodiments the NDU 410 may be located at an access point within the provider network, or generally at any point in a network where a demarcation unit, or generally, network testing functionality may be desired.

Figure 6:
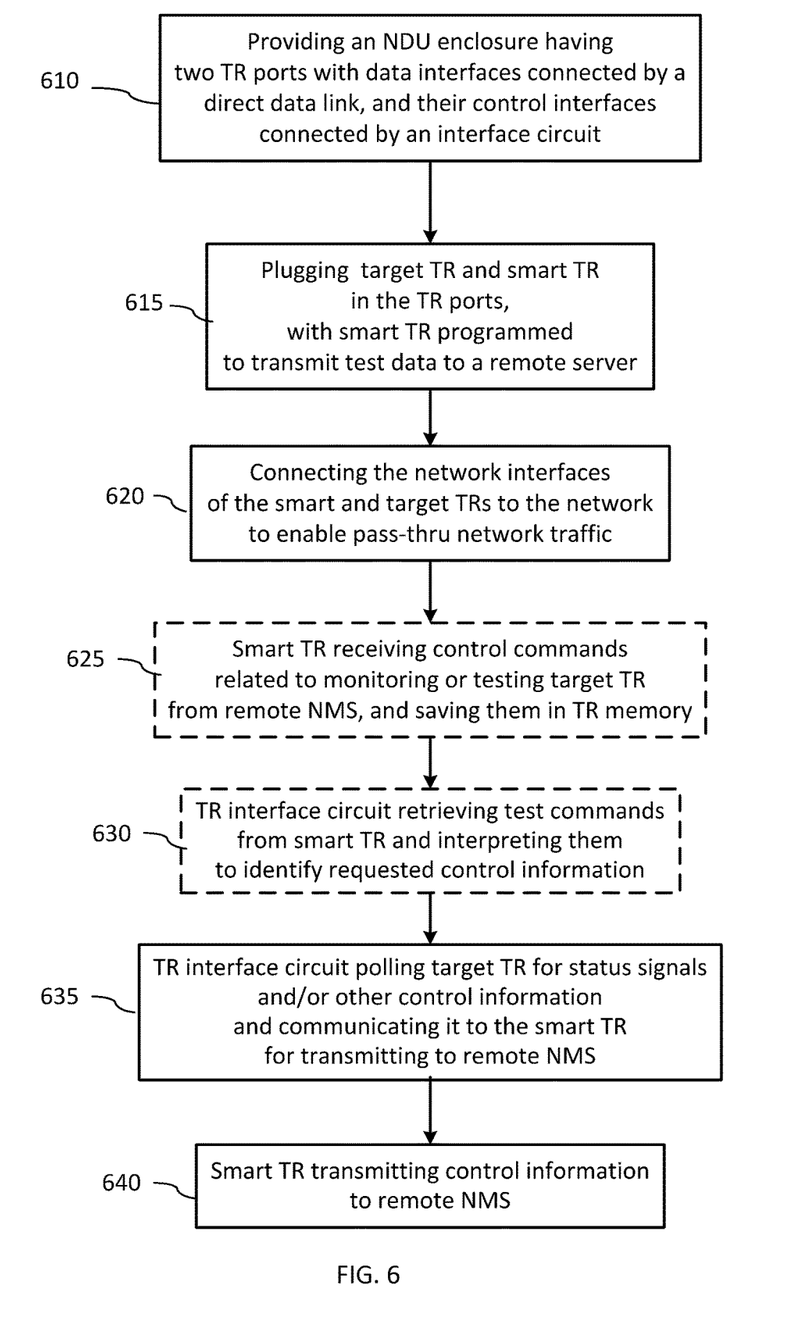
FIG. 6 is a flowchart illustrating embodiments of a method for providing a network demarcation unit (NDU)

Referring now to FIG. 6, there is shown a flowchart illustrating a method for testing a target transceiver (TR) in a communication network. At step 610, an NDU enclosure with at least two TR ports for installing two or more TRs is provided, the NDU enclosure also including a direct data link between data interfaces of the two TR ports and a TR interface circuit connecting control and management interfaces of the two TR ports. In one embodiment, the TR interface circuit is configured for facilitating transmission of control information between the target TR and a smart TR, when they are installed into the TR ports of the NDU enclosure, as described hereinabove by way of example with reference to FIGS. 1-4. At step 615, the target TR and the smart TR are installed into the two TR ports of the NDU enclosure, with the smart TR including logic configured for monitoring or testing the first TR and for communicating control information obtained from the target TR to a remote server, as generally described hereinabove with reference to FIGS. 1 and 5. In one embodiment, this logic includes at least memory registers for storing test results data received form the TR interface circuit, test data processing logic for suitably formatting the test results for transmitting to a remote server, and packet adding logic for injecting management packets carrying the test data into network traffic. In one embodiment, the smart TR further includes registers for storing test-related commands. In one embodiment, the smart TR further includes packet filtering and parsing logic for identifying management packets received from the network, for parsing them to extract test related commands, and for saving them in command registers that are accessible by the TR interface circuit of the NDU enclosure. In one embodiment, the test and monitoring logic of the smart TR may be pre-programmed with one or more commands specific to testing or monitoring of a target TR prior to installing into the NDU enclosure. Steps 610 and 615 provide, substantially, a device that may be used for remote testing and monitoring of a network transceiver. In one embodiment, steps 610 and 615 substantially provide a remotely programmable NDU; in an exemplary implementation of this embodiment, the test and monitoring logic of the smart TR may include packet-level logic configured to perform functions related to service demarcation of Ethernet services in the network, such as for example performance monitoring, activation testing at various networking layers, deep packet inspection, policing, shaping, service mapping, firewall, etc. In one embodiment, the operations illustrated in FIG. 6 provide, substantially, a method for operating the NDU in a communication network.

Continuing to refer to FIG. 6, in one embodiment the method may further include step 620 of inserting the device formed at steps 610, 615 into a communication network by connecting the network interfaces of the smart and target TRs to the network so as to enable network traffic to pass-through the device, for example as described hereinabove with reference to FIG. 4. In one embodiment, the method may proceed to step 635, wherein the TR interface circuit polls the target TR for status signals and/or other control information that in some embodiments may be requested in test related instructions, e.g. commands, received from the smart TR, and communicating the control information obtained from the target TR to the smart TR. At step 640, the smart TR may transmit the control information. In one embodiment, the method may include step 630 wherein the TR interface circuit retrieves the test commands from the command registers of the smart TR, and interprets them to identify requested control information. In one embodiment, the method may further include step 625 of remote programming of the smart TR, wherein the smart TR receives, over the network, control commands that are related to monitoring or testing the target TR, and saves them in command registers of the TR memory.

Figure 7:
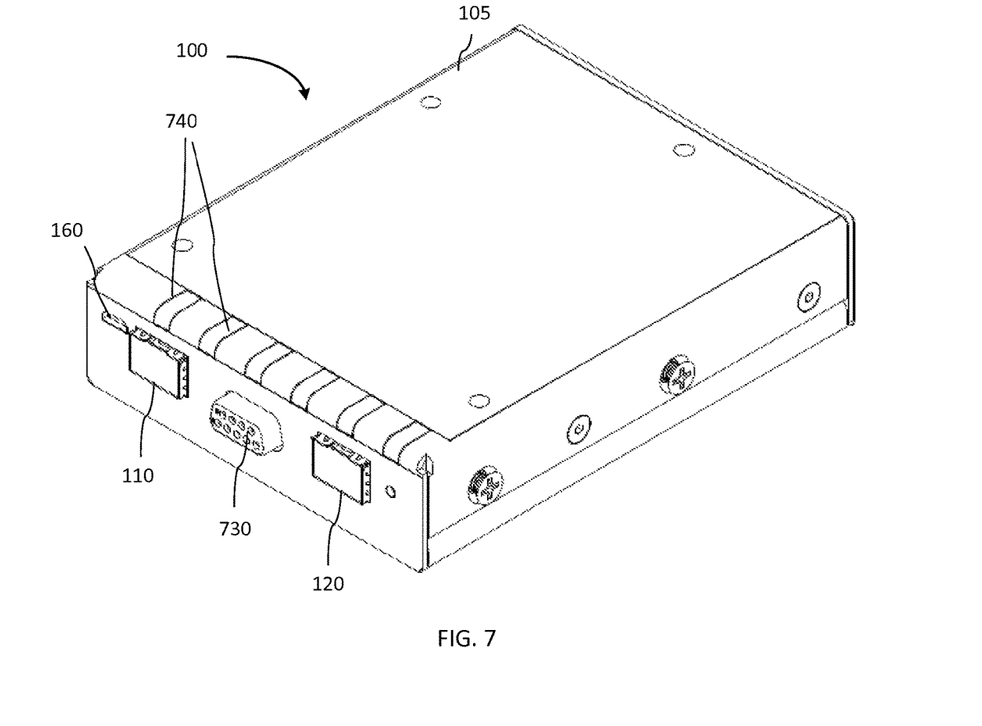
FIG. 7 is an outside 3D view of an exemplary physical implementation of the NDU enclosure.

Referring now to FIG. 7, there is shown a three-dimensional outside view of one exemplary embodiment of the NDU 100. In the shown embodiment, the first and second TR ports 110, 120 are SFP ports that comply with a SFP specification as known in the art. An additional optional 9-pin serial port 730 that connects to the IE 133 is provided for convenience of the user, and may be used for communicating to a host computer, for example at the time of installation or maintenance, or at the time of initial programming of the IE 133. A set of diagnostic LEDs 740 is further provided as status and alarm indicators, as is common in the art. One or more of these LEDs may, for example, serve as indicators of one or more of the status signals of the first TR and/or second TR, e.g. indicate the presence of absence of LOS or a TX fault condition. The power entry connector 160 is implemented by a USB connector. The housing 105 fully encloses an internal PCB (not shown) which supports the TR interface circuit 130 that is schematically illustrated in FIG. 1. It will be appreciated that in other embodiments the NDU enclosure 100 may be in a different physical form than that illustrated in FIG. 7, for example as a shelf unit.

Advantageously, the aforedescribed methods for remote testing of a target transceiver and for forming an NDU, and the NDU enclosure used in the methods enable to reduce costs associated with having a conventional NDU installed and serviced in a communication network, by eliminating the need for a fast processor in the enclosure operating at the line rate, and replacing it with a smart transceiver of the type that is currently available on the market, and that can be remotely programmed from an outside server using existing networking technologies to drive the NDU operations.

The above-described exemplary embodiments are intended to be illustrative in all respects, rather than restrictive, of the present invention. For example, although the exemplary embodiments were described hereinabove with reference to a network demarcation unit, it will be appreciated that the enclosures of the type described hereinabove may also be used in other network and/or transceiver testing applications. Furthermore, each of the exemplary embodiments described hereinabove may utilize features that were described herein with reference to other embodiments. Thus the present invention is capable of many variations in detailed implementation that can be derived from the description contained herein by a person skilled in the art. All such variations and modifications are considered to be within the scope and spirit of the present invention as defined by the following claims.

We claim:

1. A network demarcation unit (NDU) enclosure comprising:
 a housing;
 a first transceiver port in the housing for receiving a first small form factor pluggable transceiver (SFP TR);
 a second TR port in the housing for receiving a second SFP TR, the second SFP TR comprising logic configured for monitoring or testing the first SFP TR, wherein the first TR port and the second TR port each comprise a control and management interface and a data interface;
 an electrical data connection directly connecting the data interfaces of the first and second TR ports without data taping or regeneration for transparently transmitting pass-through data between the first and second SFP TRs at a line rate supported by both the first SFP TR and the second SFP TR; and,
 a TR interface circuit operatively connecting the control and management interfaces of the first and second TR ports, wherein the TR interface circuit is configured for obtaining control information from the first SFP TR, and for communicating the control information to the second SFP TR, when the first and second SFP TRs are operatively connected to the NDU enclosure at the first and second TR ports, respectively.

2. The NDU enclosure of claim 1, wherein the TR interface circuit comprises an interface engine and a communication bus connecting the interface engine to the control and management interfaces of the first and second TR ports.

3. The NDU enclosure of claim 2 including a memory device coupled to the interface engine, the memory device storing NDU enclosure identification information.

4. The NDU enclosure of claim 2, wherein the interface engine comprises a processor.

5. The NDU enclosure of claim 2, wherein the interface engine comprises protocol logic for facilitating communications between each of the first and second SFP TRs and the interface engine over the communication bus.

6. The NDU enclosure of claim 5, wherein the interface engine further comprises TR status logic for obtaining TR status signals from the first SFP TR for communicating to the second SFP TR.

7. The NDU enclosure of claim 2, wherein the TR interface circuit is configured for receiving, from the second SFP TR, one or more commands requesting the control information related to the first SFP TR, and for obtaining the control information from the first SFP TR in accordance with the one or more commands.

8. The NDU enclosure of claim 7, wherein the TR interface engine comprises TR command interpreting logic for interpreting the one or more commands received from the second SFP TR, and a TR poling logic for retrieving the control information from the first SFP TR in accordance with the one or more commands from the second SFP TR and for communicating the retrieved control information to the second SFP TR.

9. The NDU enclosure of claim 2, wherein the communication bus comprises an I2C bus.

10. The NDU enclosure of claim 1, further comprising a power distribution unit for distributing electrical power to the first and second TR ports and to the TR interface circuit.

11. The NDU enclosure of claim 1, wherein each of the data interfaces of the first and second TR ports comprises an input data line connection point and an output data line connection point, and wherein the electrical data connection comprises PCB-level wiring electrically connecting the input and output data line connection points of the first TR port to the output and input, respectively, data line connection points of the second TR port.

12. The NDU enclosure of claim 1, further comprising the second SFP TR installed-in into the second TR port.

13. The NDU enclosure of claim 12, wherein the logic in the second SFP TR comprises:
 a packet filter configured to identify, in data received from the network, control and management packets comprising commands related to monitoring or testing of the second SFP TR;
 a packet parser configured to parse the identified control and management packets to extract the commands;
 a test data processor for processing the control information obtained in accordance with the command for transmitting to a remote server; and memory for storing the commands and the control information related thereto.

14. A method for operating a network demarcation unit (NDU) in a communication network, the method comprising:
 installing a target small form factor transceiver (SFP TR) into a first TR port of an NDU enclosure comprising at least the first TR port and a second TR port, wherein the first TR port and the second TR port each comprise a data interface and a control and management interface, the NDU enclosure further comprising:
 a direct electrical data connection between the data interfaces of the first TR port and the second TR port, wherein the direct electrical data connection connects the data interfaces of the first TR port and the second TR port without data taping or regeneration; and
 a TR interface circuit connecting the control and management interfaces of the first TR port and the second TR port;
 installing an intelligent SFP TR into the second TR port of the NDU enclosure, wherein the intelligent SFP TR comprises logic for testing or monitoring of the target SFP TR and for communicating control information obtained from the target SFP TR to a remote server;
 connecting the target SFP TR and the intelligent SFP TR to the network so as to enable data pass-through; and,
 using the TR interface circuit for polling the target SFP TR installed into the first TR port for control information, and for communicating the control information to the intelligent SFP TR installed into the second TR port.

15. The method of claim 14, wherein the logic comprised in the intelligent SFP TR includes command memory storing one or more commands related to the testing or monitoring of the first SFP TR and readable by the TR interface circuit of the NDU enclosure, the method further comprising the TR interface circuit performing the acts of:
 reading the one or more commands from one or more control registers of the intelligent SFP TR;
 interpreting the one or more commands to identify the control information to be obtained from the target SFP TR;
 polling the target SFP TR for the identified control information; and,
 communicating the identified control information to the second SFP TR for transmitting to the remote server.

16. The method of claim 15, further comprising:
 sending a management message by the remote server to the intelligent SFP TR, the management message comprising the one or more commands specifying the control information to be obtained from the target SFP TR, and the intelligent SFP TR storing said one or more commands in the command memory thereof for accessing by the interface circuit of the NDU enclosure.

* * * * *